Apr. 3, 1923.
C. P. NIESMAN
1,450,220
SAW SETTING TOOL
Filed June 3, 1921
2 sheets-sheet 2
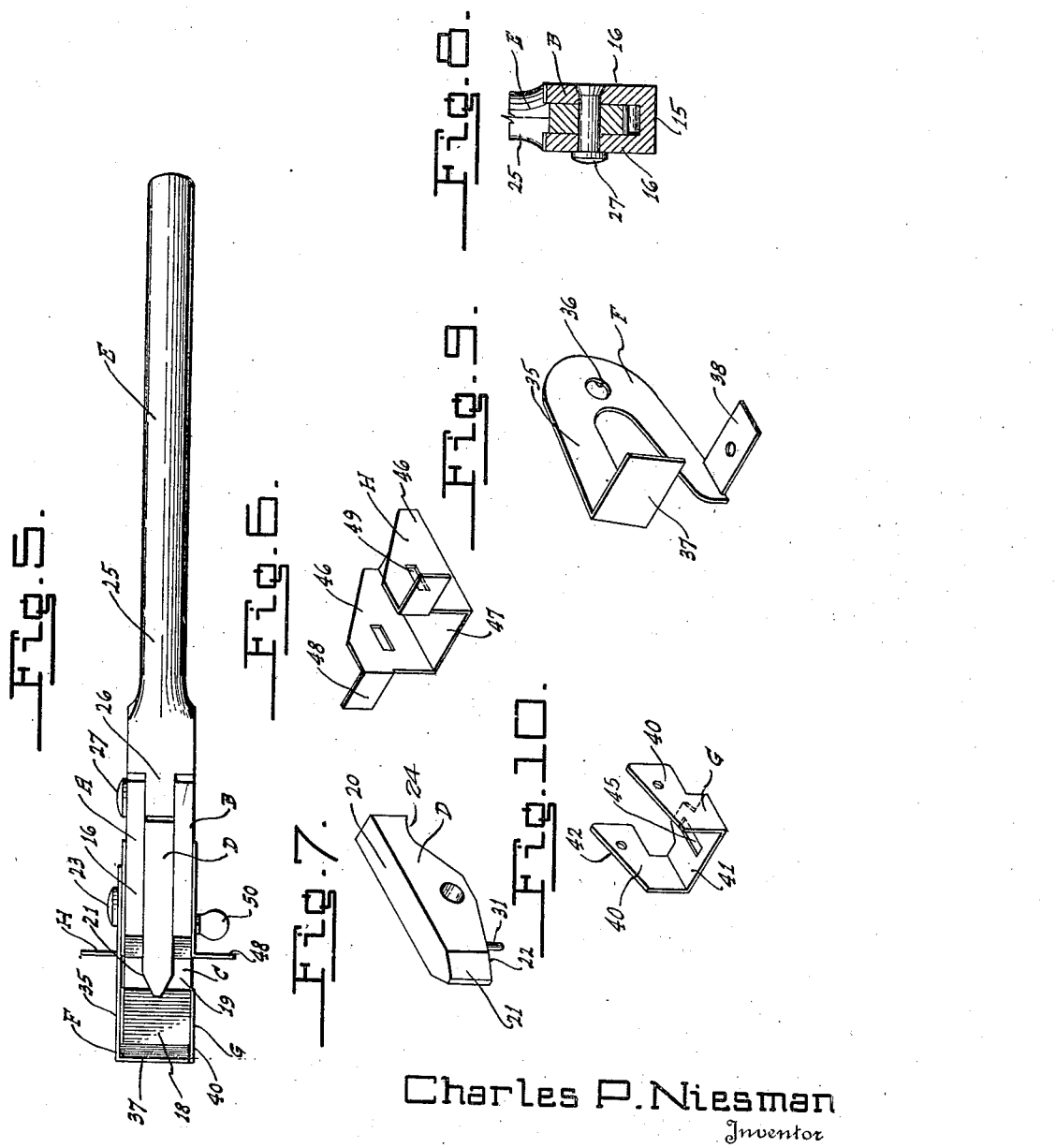
Charles P. Niesman
Inventor
By Lancaster and Allwine
Attorneys Patented Apr. 3, 1923.

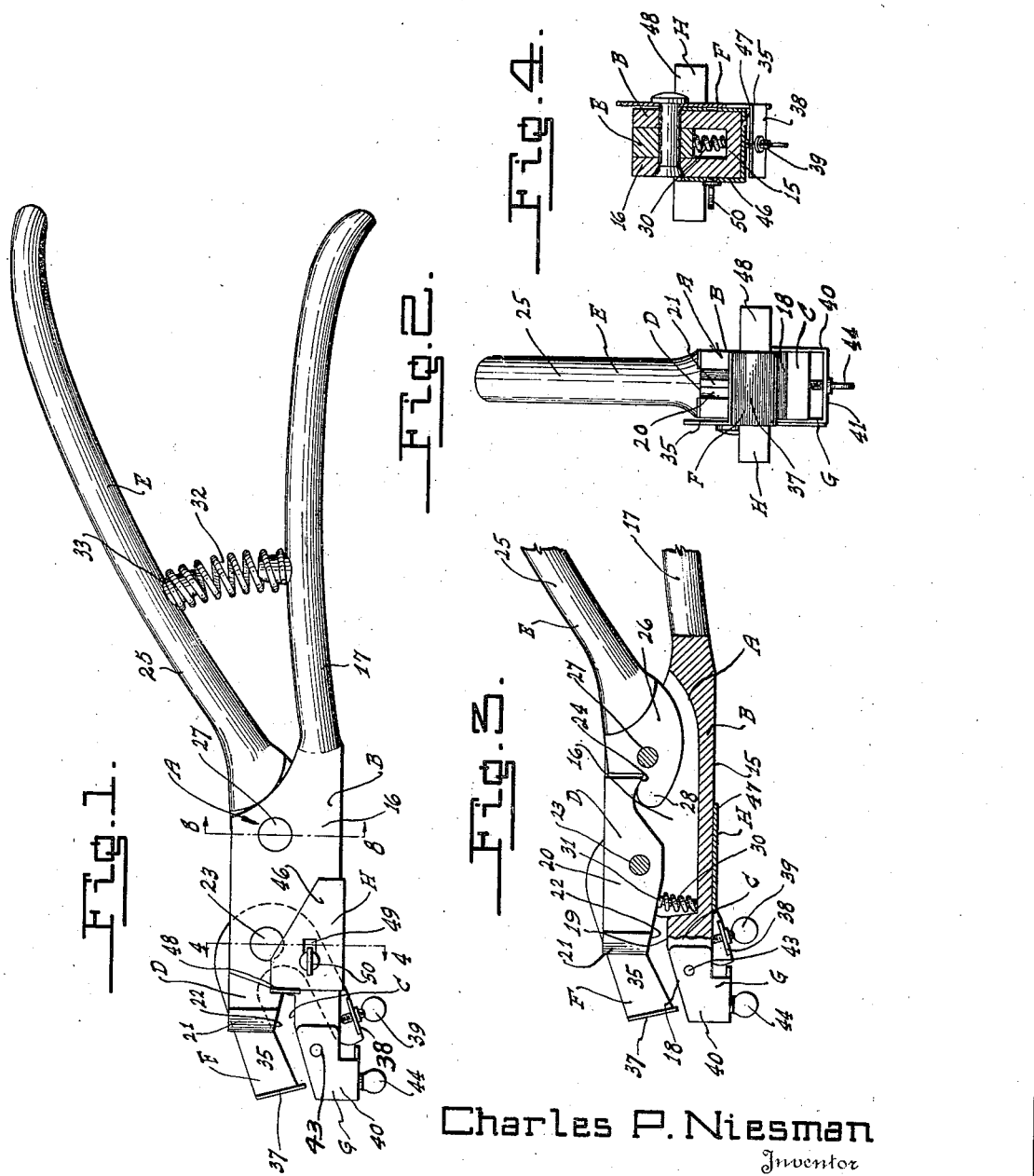

1,450,220

UNITED STATES PATENT OFFICE.

CHARLES P. NIESMAN, OF FREEPORT, ILLINOIS.

SAW-SETTING TOOL.

Application filed June 3, 1921. Serial No. 474,658.

*To all whom it may concern:*

Be it known that I, CHARLES P. NIESMAN, a citizen of the United States, residing at Freeport, in the county of Stephenson and State of Illinois, have invented certain new and useful Improvements in Saw-Setting Tools, of which the following is a specification.

This invention relates to tools for setting the teeth of saws and the primary object of the invention is to provide an improved tool of simple and durable construction which is so constructed that the teeth of a saw of either the cross cut, hand or circular type can be readily and easily set in a minimum length of time with a minimum amount of exertion.

Another object of the invention is to provide an improved saw setting tool embodying an anvil having a blade rest and an angular tooth rest, a die for engaging the tooth to be set throughout its entire length and a novel means for operating the die, the anvil and die being so constructed and so arranged in relation to each other that the same and the tooth being set will always be within the sight of the operator, so that the setting operation will be expedited.

A further object of the invention is to provide a novel gauge for controlling the set or the angle of the saw teeth and a novel tooth gauge for permitting the tool to be adjusted according to the length of the saw teeth, so that the tool can be conveniently used with different sizes of saws.

A still further object of the invention is to provide an improved saw setting tool of the above character, embodying a minimum number of parts and which can be easily manufactured and placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings, Figure 1 is a side elevation of the improved tool.

Fig. 2 is a front elevation of the improved tool.

Fig. 3 is a fragmentary longitudinal section through the tool illustrating the means for operating the striking member or die.

Fig. 4 is a transverse section through the improved tool taken on the line 4—4 of Figure 1.

Fig. 5 is a top plan view of the improved tool.

Fig. 6 is a detail perspective view of the tooth gauge for permitting the tool to be used with saws of different sizes.

Fig. 7 is a detail perspective view of the striking member or die.

Fig. 8 is a transverse section taken on the line 8—8 of Figure 1.

Fig. 9 is a detail perspective view of the upper gauge for regulating the set or angle of the saw teeth.

Fig. 10 is a detail perspective view of the lower gauge for regulating the set or angle of the saw teeth.

Referring to the drawings in detail, wherein similar reference characters designate corresponding parts throughout the several views, the letter A indicates the improved tool, which includes the body B, having the anvil C, the striker or die D, the operating device E for the striker or die, the upper and lower setting gauges F and G, and the tooth gauge H.

The body B is substantially U-shaped in cross section and includes the lower wall 15 and the side walls 16. The lower wall 15 has formed integrally therewith or secured thereto in any preferred manner the rearwardly extending handle 17. The forward end of the wall 15 has formed thereon the anvil C, which will now be described.

The anvil C is preferably of a solid structure and includes the inclined blade receiving face or rest 18 and the tooth rest or receiving face 19. It can be seen that the face 19 extends at an angle to the face 18.

The side walls 16 of the body B extends upwardly from and rearwardly of the anvil C and the striking member or die D is arranged between these side walls.

The striker or die D is preferably formed of tool steel and includes the longitudinally extending solid body 20, the forward end of which is tapered, as at 21. The inner end of the body 20 extends inwardly at an angle, as indicated by the numeral 22 and this edge or face overlies the tooth rest or face 19. A transversely extending pivot pin 23 is utilized for pivotally connecting the striker or the die D in position and this pivot pin is located intermediate the ends of the striker and has its terminals mounted in the side walls 16 of the body B. The inner end of the body 20 of the striker or die D is provided with a hooked shaped bearing portion 24, the purpose of which will be hereinafter more fully described.

The means E for operating the striker or die D includes an operating handle or lever 25 which extends outwardly in substantial parallel relation to the handle 17. The inner end of the handle or lever 25 is provided with a cam shaped extension 26, which is arranged intermediate the side walls 16 of the body B and secured thereto by means of a pivot pin 27. The inner end of the cam 26 is provided with a nose 28 which is adapted to engage the hook shaped bearing portion 24 of the die D and it can be seen that upon inward movement of the handle 25, that the striker or die D will be rocked on its pivot pin 23 and the terminal 21 thereof brought into engagement with the tooth rest 19.

This means E provides a simple operating device for the striker and permits a relatively large leverage to be obtained. The outer end of the striker or die D is normally held in a raised position by means of an expansion coil spring 30, the terminals of which are respectively fitted on suitable lugs 31 carried by the lower end of the striker D forwardly of the pivot pin 23 thereof and a lug carried by the inner face of the wall 15. The lever or handle 25 is also normally held in an extended position, by means of an expansion coil spring 32, which has its terminals respectively coiled about suitable inwardly extending lugs 33 carried by the handle 25 and by the handle 17.

It can be seen that by placing a saw blade on the face 18 one tooth thereof will overlie the tooth rest 19 and upon the actuation of the lever or handle 25, that the striker or die D be forced into engagement with the saw tooth and thus effectively set the angle thereof. By sliding the tool along the edge of the saw blade, it can be seen that all of the teeth can be readily set.

The upper and lower gauges F and G are provided in order to regulate the set or the angle of the saw teeth and the upper gauge F comprises a side plate 35 of a substantially U shape. The side plates 35 at its angle is provided with an opening 36 which is adapted to receive the forward pivot pin 23. Thus it can be seen that the plate can be moved up or down. The forward end of the upper arm of the plate is provided with a right angularly extending transversely positioned gauge plate 37 which is adapted to overlie the face or blade rest 18. The lower arm of the side plate 35 is provided with an inwardly extending right angularly disposed lug 38, which underlies the anvil C and this lug 38 carries an adjusting set screw 39 which is adapted to engage the lower surface of the anvil for moving the gauge plate 37 toward and away from the upper surface of the anvil.

The lower gauge member G is of substantially U shape in cross section and includes the side walls 40 and the connecting lower wall 41. The upper edges of the side walls 40 are inclined downwardly as at 42 in order to conform to the inclination of the face or blade rest 18. These side walls 40 have openings at their rear ends in order to receive a pivot pin 43 which permits the inclined edges of the side walls 40 to be adjusted in relation to the inclined face 18. It can be seen that by moving the inclined edges 42 above the upper surface of the face 18, that the inclination at which the blade of the saw will extend in relation to the tooth rest or face 19 can be regulated. A suitable set screw 44 is carried by the lower forward end of the anvil C and extends through a slotted guide way 45 formed in the connecting wall 41. By adjusting the set screw 44, the gauge G can be readily swung on its pivot pin 43.

The tooth gauge H is also of substantially U shaped cross section and is adapted to embrace the side walls of the body directly in rear of the anvil face. This gauge H includes the side walls 46 and the connecting lower wall 47. The forward edges of the side walls 46 are provided with outwardly extending right angularly disposed ears 48 which are adapted to be moved toward and away from the anvil and form stops for the edges of the teeth in order to regulate the position thereof in relation to the face or tooth rest 19. The side walls 46 are provided with guide slots 49 which are adapted to receive suitable set screws 50 carried by the body B. By adjusting the set screws 50, the gauge H may be held in any preferred adjusted position.

In use of the improved tool, the gauge H is first adjusted in accordance with the side of the saw teeth after which the gauges F and G are adjusted according to the angle or set, at which the teeth are to be struck. After the gauges have been adjusted in accordance with the characteristic of the saw, the toothed edge thereof is placed on the face 18, as heretofore stated with the teeth thereof projecting over the face 19 and one tooth directly below the inclined surface 22 of the striker or the die D. After this the handle 25 is operated which brings this surface into contact with the tooth of the saw and thus setting the same to the desired angle. The saw can then be reversed in order to set the next tooth opposite to the tooth already set, or the saw blades can be slid along the tool and each alternate tooth set in the same angle, after which the blade can be reversed and the other teeth set.

From the foregoing description, it can be seen that a novel saw-setting tool has been provided of exceptionally simple and durable construction, and by which teeth of a saw can be readily and easily set.

Changes in details may be made without departing from the spirit or scope of this invention, but what I claim as new is,

I claim:

1. A saw setting tool comprising a body U-shaped in cross section, an anvil formed on the forward end of the body, a rearwardly extending handle formed on the rear end of the body, a die pivotally secured intermediate its end to the body, the anvil having a pair of angularly related faces, the die having inclined face arranged to overlie one of the angle faces, spring means normally urging the forward end of the die to a raised position, an operating lever, means operatively connecting the lever and the die together, means interposed between the handle and lever for normally holding the same in an extended position in relation to each other, and an upper and lower U-shaped anvil tooth gauges carried by the body arranged for movement toward and away from the other angle face of the anvil.

2. A saw setting tool comprising a body U-shaped in cross section, a forwardly extending anvil formed on the body including a pair of angular related faces, a rearwardly extending handle formed on the body, a die having a forward pointed end and a lower inclined face, an operating lever pivotally secured in the body, means pivotally securing the die' in the body intermediate its ends, a U-shaped gauge member pivotally secured to the anvil having inclined faces arranged for movement toward or away from the upper face of the anvil, and an upper gauge including a right angularly extending clamp plate arranged for movement toward and away from the upper surface of the anvil.

3. A saw setting tool comprising a body, an anvil formed on the body, a pair of operating handles carried by the body, a die pivotally secured intermediate its ends and operatively connected to one of said handles, upper and lower angle tooth setting gauges pivotally carried by the body and arranged for movement toward and away from the inner face of the anvil, and a sliding toothed gauge mounted upon the body inwardly of the first mentioned gauges and arranged for movement longitudinally of the anvil.

4. A saw setting tool comprising a body, an anvil formed on the body, a pair of operating handles carried by the body, a die pivotally secured intermediate its ends and operatively connected to one of the handles, an upper angle gauge for the saw teeth including a substantially U-shaped side plate pivoted at its bight portion to the body, a cross plate formed on one of the free ends of the U-shaped plate arranged to lie over the anvil, a flat substantially horizontally disposed adjusting plate rigidly secured to the other free end of the U-shaped side plate, and means carried by said adjusting plate for engaging the lower surface of the body for moving the cross plate toward and away from said anvil.

5. A saw setting tool comprising a body, an anvil formed on the body including a pair of angular related faces, a pair of operating handles carried by the body, a die pivotally secured intermediate its ends and operatively connected to one of said handles, a lower angle tooth setting gauge substantially U-shaped in cross section including a lower flat connecting adjusting wall arranged to lie below the body, and parallel side walls arranged to engage the opposite sides of the body, means pivotally securing the side plates adjacent to their rear terminals to the body, the upper edges of said side plates being inclined, and means engaging the body and the adjusting connecting wall for swinging said gauge on its pivot.

CHARLES P. NIESMAN.